US008046732B2

(12) United States Patent
Shaburov

(10) Patent No.: US 8,046,732 B2
(45) Date of Patent: Oct. 25, 2011

(54) DISTRIBUTION OF DATA CHANGES IN PATTERN CONFIGURATIONS

(75) Inventor: Victor V. Shaburov, Leimen (DE)

(73) Assignee: SAP AG, Walldorf (DE)

( * ) Notice: Subject to any disclaimer, the term of this patent is extended or adjusted under 35 U.S.C. 154(b) by 968 days.

(21) Appl. No.: 11/322,622

(22) Filed: Dec. 30, 2005

(65) Prior Publication Data

US 2007/0157161 A1 Jul. 5, 2007

(51) Int. Cl.
*G06F 9/44* (2006.01)
(52) U.S. Cl. ........ 717/104; 717/106; 717/110; 717/111; 717/113; 717/114
(58) Field of Classification Search .................. 717/104, 717/106, 110, 111, 113, 114
See application file for complete search history.

(56) References Cited

U.S. PATENT DOCUMENTS

| | | | |
|---|---|---|---|
| 5,603,034 A * | 2/1997 | Swanson ........................ | 717/111 |
| 5,604,516 A | 2/1997 | Herrod et al. | |
| 5,627,979 A | 5/1997 | Chang et al. | |
| 5,764,973 A | 6/1998 | Lunceford et al. | |
| 5,826,257 A | 10/1998 | Snelling, Jr. | |
| 5,844,554 A | 12/1998 | Geller et al. | |
| 5,956,736 A | 9/1999 | Hanson et al. | |
| 5,988,862 A | 11/1999 | Kacyra et al. | |
| 5,999,940 A | 12/1999 | Ranger | |
| 6,035,300 A | 3/2000 | Cason et al. | |
| 6,044,217 A * | 3/2000 | Brealey et al. ................. | 717/114 |
| 6,173,246 B1 * | 1/2001 | Billups, III ..................... | 703/22 |
| 6,212,672 B1 | 4/2001 | Keller et al. | |
| 6,249,905 B1 | 6/2001 | Yoshida et al. | |
| 6,279,109 B1 | 8/2001 | Brundridge | |
| 6,330,007 B1 | 12/2001 | Isreal et al. | |
| 6,434,568 B1 | 8/2002 | Bowman-Amuah | |
| 6,437,805 B1 | 8/2002 | Sojoodi et al. | |
| 6,539,396 B1 | 3/2003 | Bowman-Amuah | |
| 6,577,323 B1 * | 6/2003 | Jamieson et al. ............. | 715/700 |
| 6,609,127 B1 * | 8/2003 | Lee et al. ........................ | 707/10 |
| 6,609,128 B1 | 8/2003 | Underwood | |
| 6,631,497 B1 | 10/2003 | Jamshidi et al. | |
| 6,778,863 B1 * | 8/2004 | Lienhard et al. ................ | 700/32 |
| 6,915,301 B2 | 7/2005 | Hirsch | |
| 6,983,421 B1 | 1/2006 | Lahti et al. | |
| 6,985,898 B1 | 1/2006 | Ripley et al. | |
| 7,120,865 B1 | 10/2006 | Horvitz et al. | |
| 7,120,876 B2 | 10/2006 | Washington et al. | |

(Continued)

OTHER PUBLICATIONS

Slay, et al. "Augmented Reality as a Visualisation Tool within Information Visualisation", 2002, SAICSIT, p. 252.*

(Continued)

*Primary Examiner* — Wei Zhen
*Assistant Examiner* — Qamrun Nahar
(74) *Attorney, Agent, or Firm* — Mintz, Levin, Cohn, Ferris, Glovsky & Popeo, P.C.

(57) ABSTRACT

A method, computer program product, and system for distributing changes to an application are disclosed. A graphical application modeling tool is provided for displaying a model of a pattern of the application. The model has a plurality of elements, where each element is linked to another element via a port. Each port representing a class that contains information about the pattern qualities of that port as related to the element. A change that is applied to a first element of the plurality of elements of the model is propagated to a second element of the plurality of elements via linked ports associated with the first and second elements.

19 Claims, 11 Drawing Sheets

U.S. PATENT DOCUMENTS

| | | | |
|---|---|---|---|
| 7,171,647 B1 * | 1/2007 | Smith et al. | 717/105 |
| 7,257,597 B1 | 8/2007 | Pryce et al. | |
| 7,316,000 B2 * | 1/2008 | Poole et al. | 717/104 |
| 7,320,005 B2 | 1/2008 | Li et al. | |
| 7,366,723 B2 | 4/2008 | Shaburov | |
| 2002/0026441 A1 | 2/2002 | Kutay et al. | |
| 2002/0026461 A1 | 2/2002 | Kutay et al. | |
| 2002/0111945 A1 | 8/2002 | Young et al. | |
| 2002/0199025 A1 | 12/2002 | Kutay et al. | |
| 2003/0028451 A1 | 2/2003 | Ananian | |
| 2003/0041311 A1 * | 2/2003 | Poole et al. | 717/100 |
| 2003/0101025 A1 | 5/2003 | Shah et al. | |
| 2003/0120599 A1 | 6/2003 | Agboatwalla et al. | |
| 2003/0126152 A1 | 7/2003 | Rajak | |
| 2003/0154191 A1 | 8/2003 | Fish et al. | |
| 2004/0001092 A1 | 1/2004 | Rothwein et al. | |
| 2004/0017392 A1 | 1/2004 | Welch | |
| 2004/0036719 A1 | 2/2004 | Van Treeck | |
| 2004/0107414 A1 * | 6/2004 | Bronicki et al. | 717/105 |
| 2004/0193579 A1 | 9/2004 | Dettinger et al. | |
| 2004/0205691 A1 * | 10/2004 | Poole et al. | 717/100 |
| 2004/0268228 A1 | 12/2004 | Croney et al. | |
| 2005/0015364 A1 | 1/2005 | Payton et al. | |
| 2005/0055666 A1 | 3/2005 | Kornerup et al. | |
| 2005/0055667 A1 | 3/2005 | Beringer et al. | |
| 2005/0120347 A1 * | 6/2005 | Asare et al. | 717/106 |
| 2005/0257157 A1 | 11/2005 | Gilboa et al. | |
| 2005/0257190 A1 | 11/2005 | Shaburov et al. | |
| 2006/0036745 A1 | 2/2006 | Stienhans et al. | |
| 2006/0074967 A1 | 4/2006 | Shaburov | |
| 2006/0075382 A1 | 4/2006 | Shaburov | |
| 2006/0085681 A1 * | 4/2006 | Feldstein et al. | 714/25 |
| 2006/0085764 A1 | 4/2006 | Klementiev | |
| 2007/0089087 A1 * | 4/2007 | Connor et al. | 717/105 |
| 2007/0277114 A1 | 11/2007 | Mudge et al. | |

OTHER PUBLICATIONS

Papakonstantinou, et al., "Qursed: Querying and Reporting Semistructured Date," ACM SIGNMOD, Jun. 4-6, 2002, 12 pages, pp. 192-203.

WindowsITPro, "Visual Studio .NET Database Features," Jan. 24, 2002, 2 pages, http://www.winnetmag.com/SQLServer/Article/ArticleID/23364/23364.html.

Oracle Technology Network, "Oracle Jdeveloper 10g New Features," Apr. 2004, updated Aug. 2005, 7 pages, http://wwvv.oracle.com/technology/products/jdev/collateral/jdev10g_fo.html.

* cited by examiner

DISTRIBUTION OF DATA CHANGES IN PATTERN CONFIGURATIONS

FIELD OF THE INVENTION

The present disclosure relates to methods, products and systems for distributing changes to an application.

BACKGROUND

A structured approach to developing web applications includes a model-driven tool such as SAP's Visual Composer, which allows a developer to compose applications in a flexible way by using patterns. A pattern graphically depicts functional components as drag-and-drop services, and defines a data flow between the components. User interface patterns can be defined at various levels, and can be nested within each other, thus creating hierarchies of patterns. At the top level of the hierarchy, a pattern can act as a model or "floor plan" for a user interface that is designed to help end-users complete a specific business process. The floor plan defines the user interface of the application by specifying an overall screen layout for the user interface and managing and orchestrating any nested patterns.

In current implementations of pattern-based configurations, there is a strict separation of components that are related to data handling (i.e., services) and other component that are focused on user interactions (i.e., scenarios). If a service element is changed, e.g. a new attribute is created, this change is not propagated through the whole model because only a service class is associated with the backend meta data, e.g. business object node meta data.

There is currently no generic code distribution mechanism in pattern-based application development environments. Kit developers thus require code distribution, logic for every kit. This increased need for resources to write a kit makes implementation of distribution by different people too different and not always fitting together. Further, the conventional mechanisms for distribution of code created dependency between different kits. Implementing the logic in the pattern components is also not a viable solution, because such implementation violates the modularization of every component. The distribution logic has to be implemented in a more generic layer.

The pattern idea means that it is possible to create new composition unit and plug in these new components without any changes to already existing components. The consequence is that existing components are not allowed to be edited for a new component. An abstraction layer is needed to define that one component wants to host some other components, but does not make any assumptions about the used components, because the used component is added in a dynamic way.

SUMMARY

This document discloses a application code distribution mechanism that provides strict separation of components that are related to data handling from other components that are focused on user interactions. In an aspect, the distribution mechanism is generic across all layers, to provide a common distribution mechanism for any development platforms, without the need for specialized coding by kit developers. Further, the distribution mechanism is implemented in an abstract layer, which does not create dependencies between different kits. The distribution mechanism minimizes required user interactions to propagate changes in business diagrams. As a result, changes to business diagrams and their underlying models are propagated dynamically and generically, independent of concrete business case.

In another aspect, a method and a computer program product are provided to implement a process of distributing changes in a network-based application. The process includes the steps of providing a graphical application modeling tool displaying a model of a pattern of the application. The model has a plurality of elements, where each element is linked to another element via a port. Each port representing a class that contains information about the pattern qualities of that port as related to the element. The process further includes the step of propagating a change applied to a first element of the plurality of elements of the model to a second element of the plurality of elements via linked ports associated with the first and second elements.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
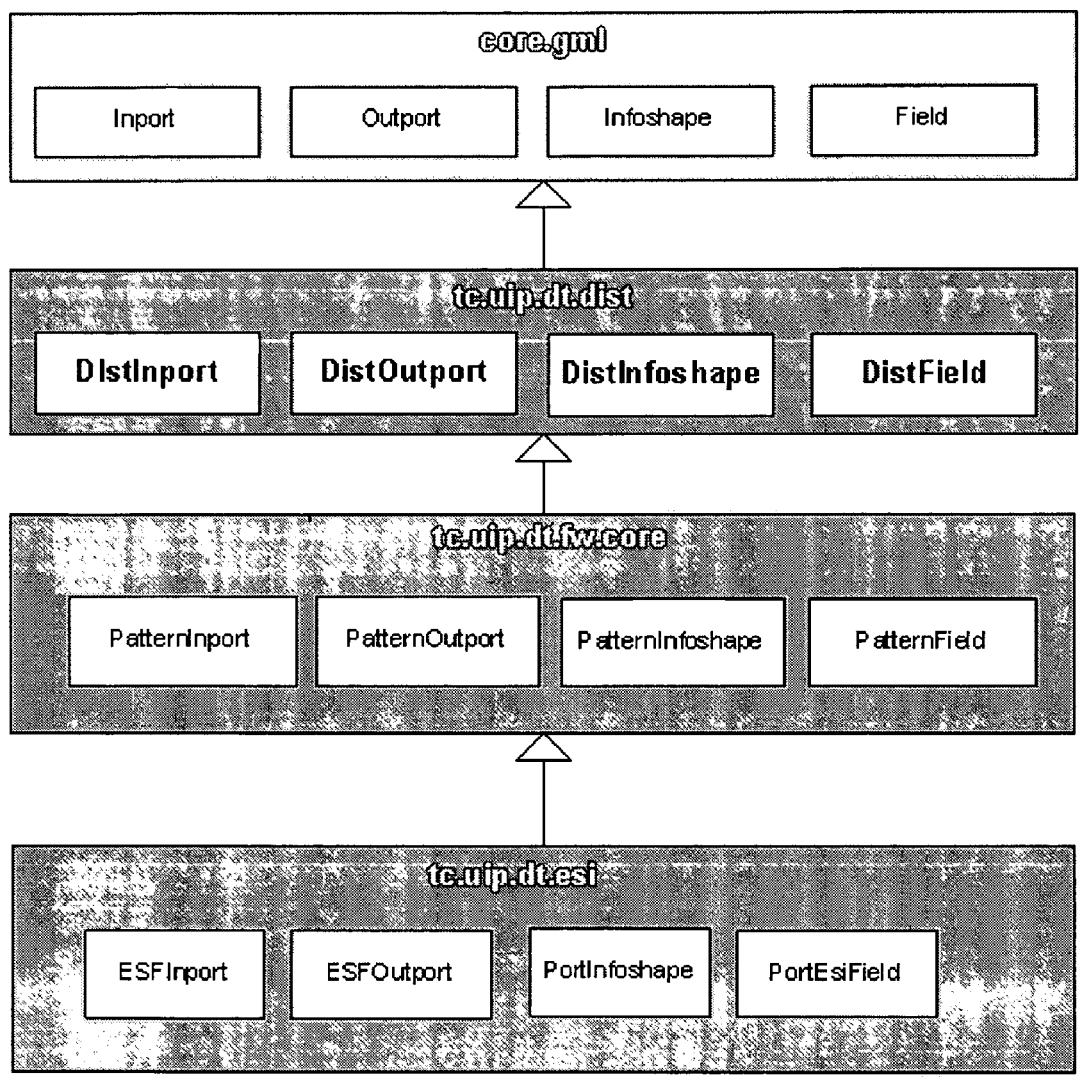
FIG. 1 illustrates a distribution layer of the design-time architecture in accordance with an exemplary embodiment.

This document describes a distribution mechanism for a visual modeling tool for web-based applications. An architecture for the distribution mechanism introduces a strict separation of components that are related to data handling (service) from component that are focused on user interactions (scenario) in the pattern configuration. To make the pattern configuration as generic as possible, a distribution mechanism is implemented as part of the pattern infrastructure kit. FIG. 1 illustrates a distribution layer. Infrastructure kit classes are modified to support the distribution mechanism. The distribution logic is implemented in the classes DistInport and DistOutport. The logic of Infoshape copying is implemented in DistInfoshape.

Elements in the model are linked to each other by links and ports. Ports hold infoshapes that contain the data (fields). When the content of the infoshape of a port is changed, the changes need to be distributed to all the elements that are connected to that port. Ports are configured to receive the new infoshape, update their own infoshape, notify elements about the change, and forward the distributed infoshape to all relevant elements.

When a basic behavior is not needed, it can be overridden with another behavior in accordance with one of two methods. A method distributeInfoshape is used where the basic port classes contain the distribution logic. A callback method onDistributeInfoshape can be implemented by every class in pattern kits that listens to notifications about the infoshape updates.

Figure 11:
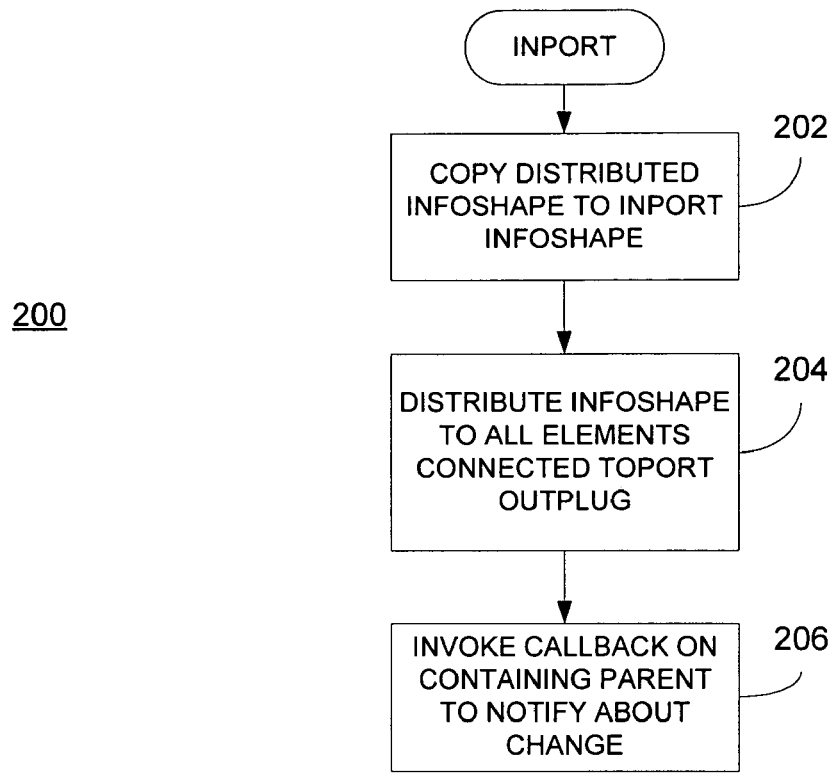
FIG. 11 illustrates a method for distributing changes to application components in a design-time architecture.
Figure 11:
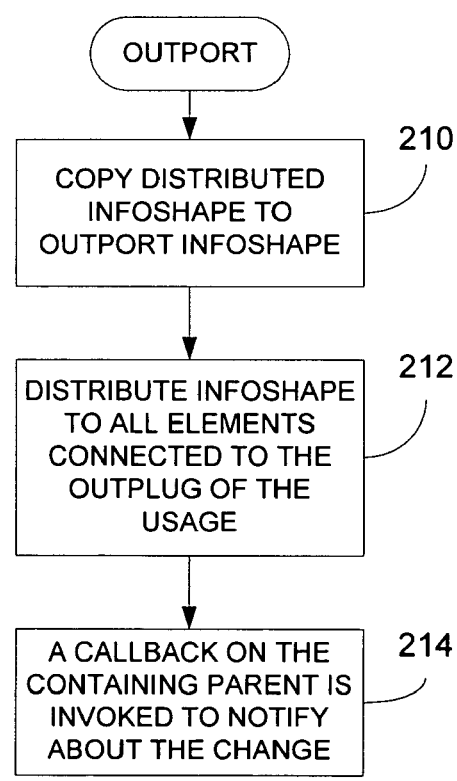

As shown in FIG. 11, a distribution method 200 works differently for inports and outports. An inport is the starting point of distribution to the current unit. At 202, the distributed infoshape is copied to the inport infoshape. At 204, the distributed infoshape is distributed to all elements that are connected to the outplug of the port. At 206, a callback is invoked on the containing parent to notify about the change. An outport is a starting point for distributing to the outer units. At 210, the distributed infoshape is copied to the outport infoshape. At 212, the distributed infoshape is distributed to all elements connected to the outplug of the usage. At 214, a callback on the containing parent is invoked to notify about the change.

A pattern can have multiple usages in the model, and need not be updated more than once. A flag is generated and kept for each pattern instance to indicate whether it was updated or not. When the distribution process gets to a pattern, it is flagged as updated. When the distribution iteration finishes, the flags are cleared. The distribution will take place for scenarios only, and not services, since services create their own data.

Figure 2:
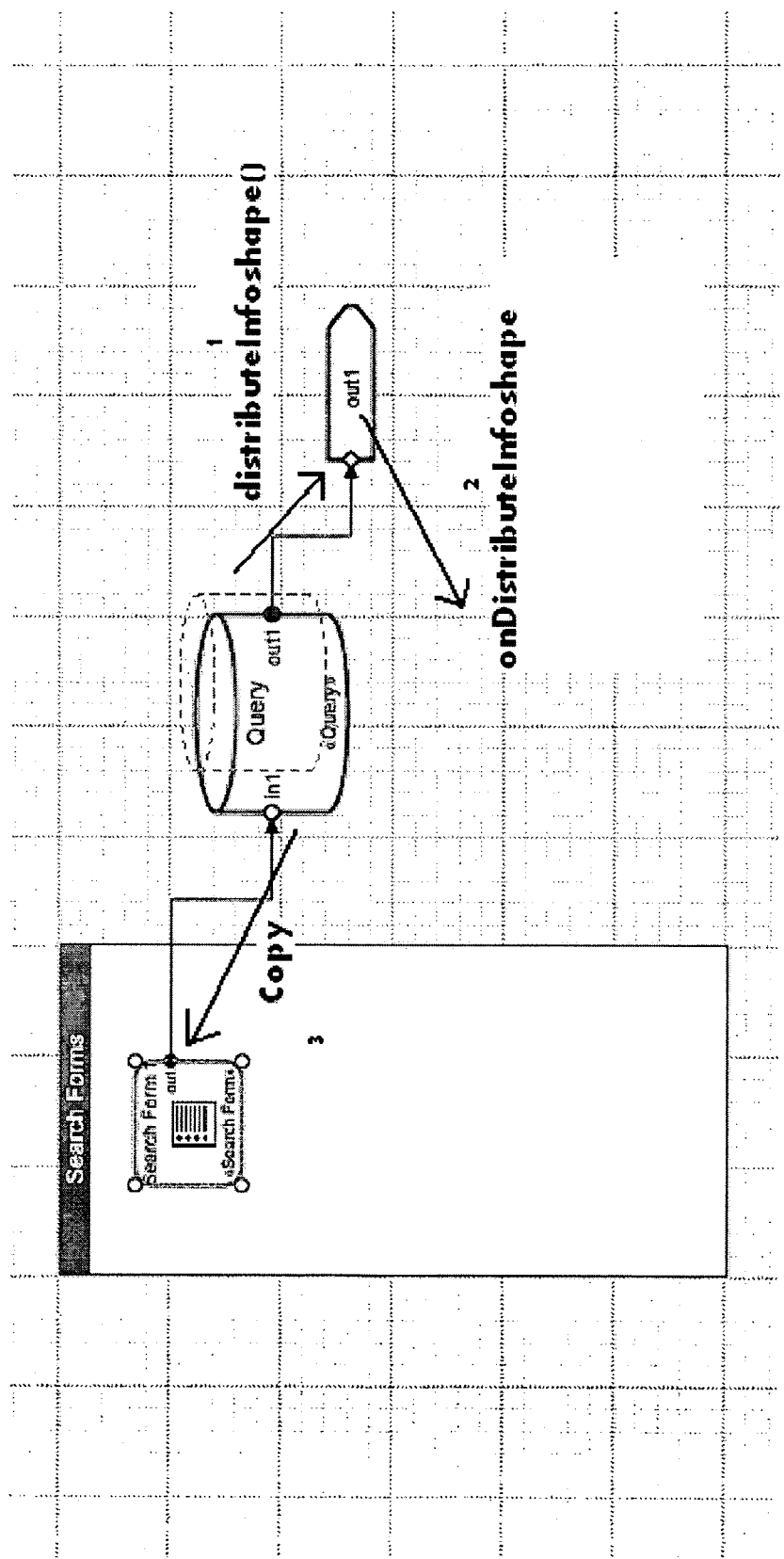
FIGS. 2-7 illustrate a method for distributing changes in the design-time architecture for building applications.

FIGS. 2-7 illustrate a method for distributing changes. FIG. 2 shows a first step to change the query of a service element. The data is propagated to the outports of the diagram and the infoshape is updated. Next, the changes are propagated to the unit itself using the callback method onDistributeInfoshape on the parent diagram. The consequence is that the implementation has to do all the required changes, e.g. updating the elements that are connected to the inports of the service element, because the distribution algorithm works normally only in the direction of the links.

Figure 3:
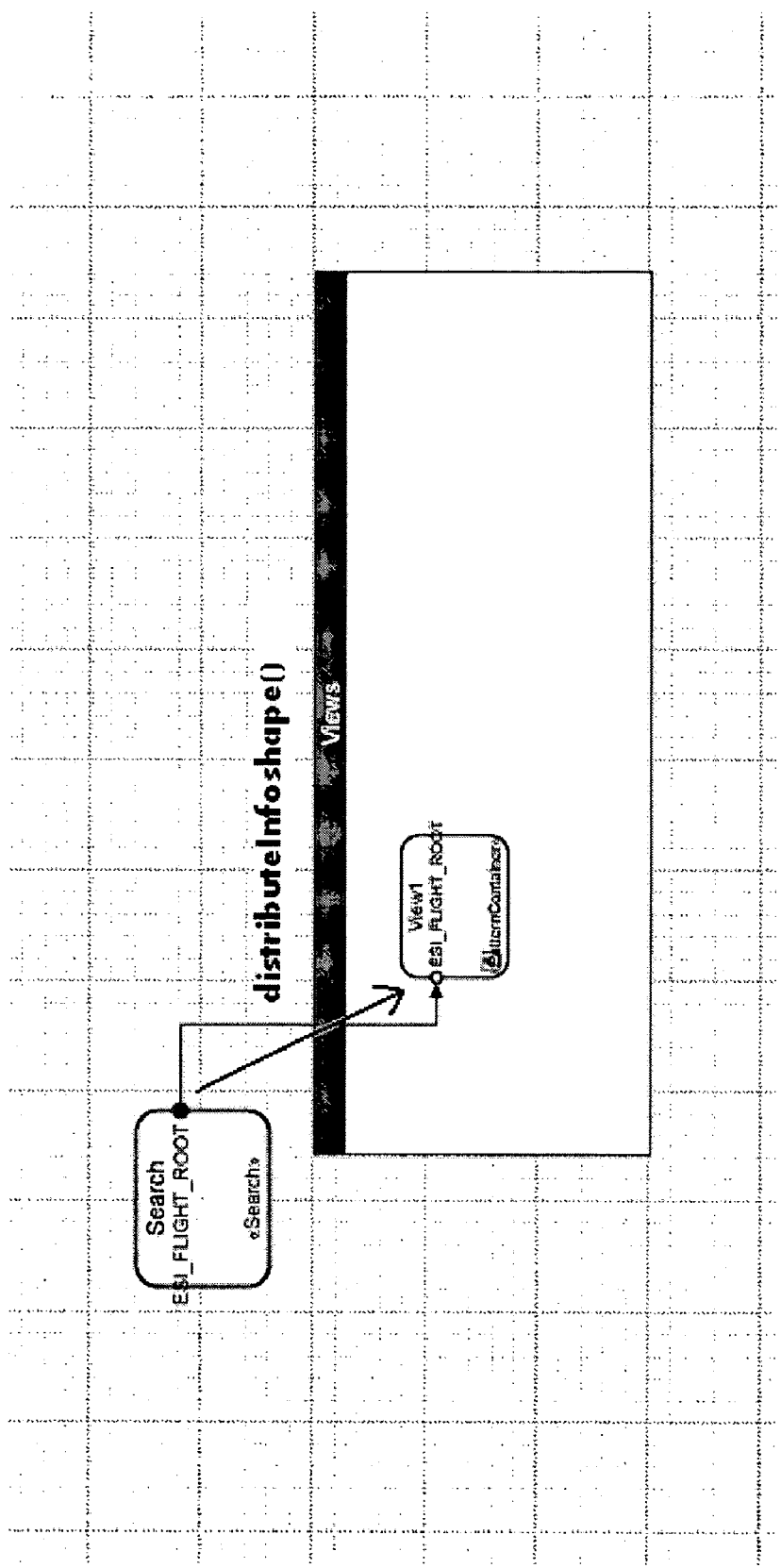
Figure 4:
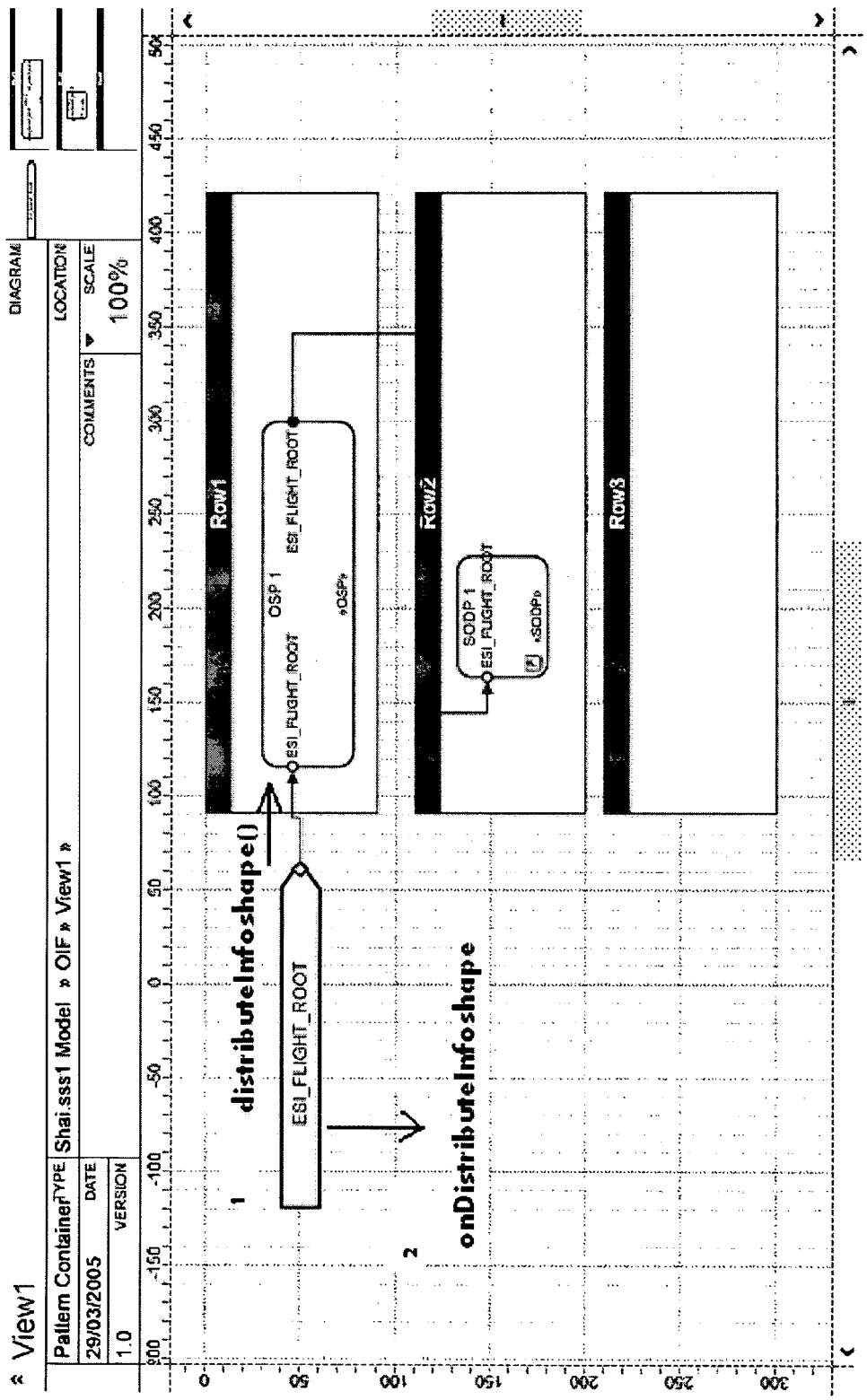

FIG. 3 illustrates the change being distributed to other scenarios. Here, the change of the infoshape of the outport is also distributed to the inports of all other connected scenarios. This is done by invoking the method distributeInfoshape on the ports of the connected scenarios. FIG. 4 illustrates the change being distributed to all inner components. The implementation of the inport calls the method distributeInfoshape on all connected inports of components. Next, the callback method onDistributeInfoshape is called.

Figure 5:
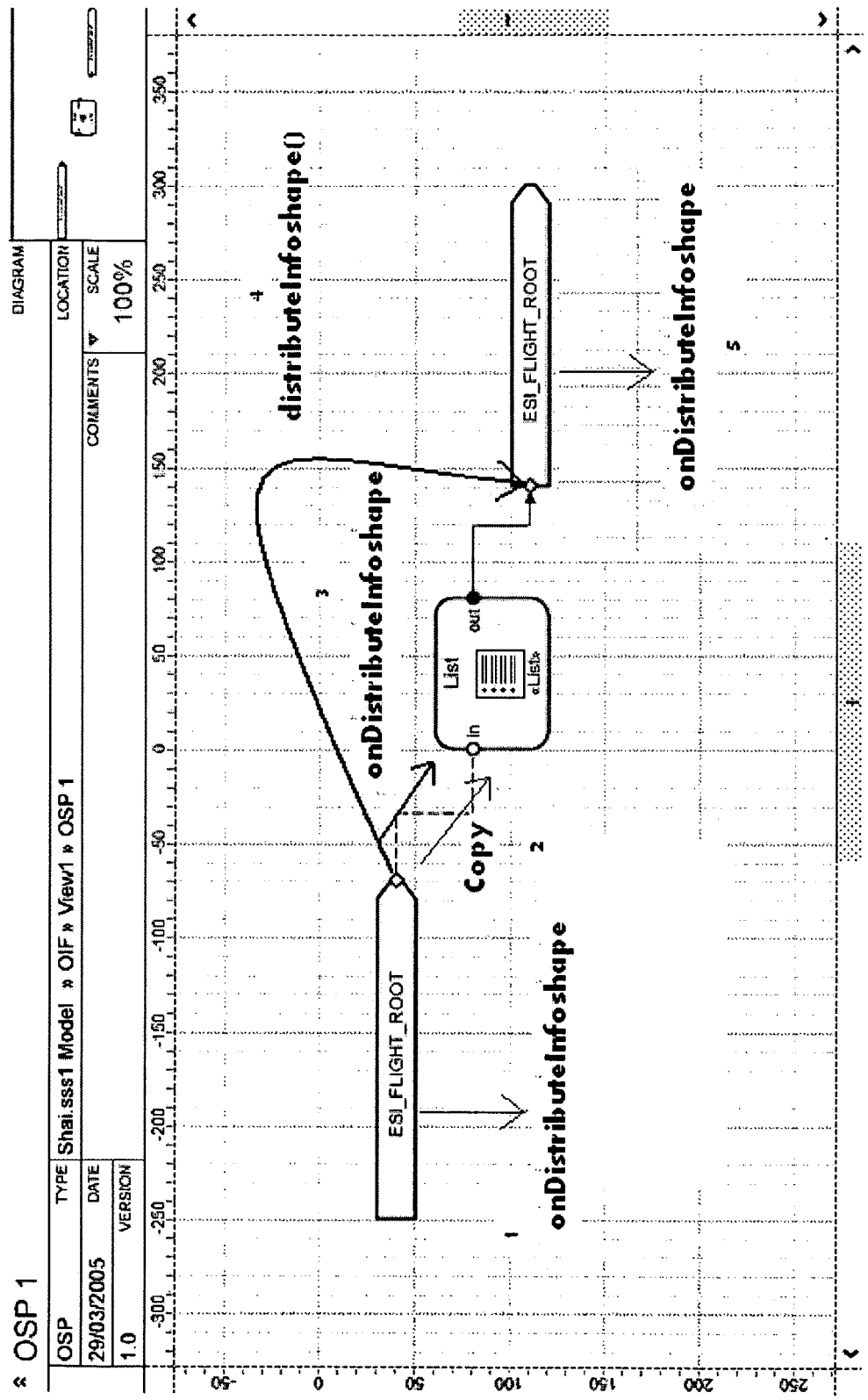
Figure 6:
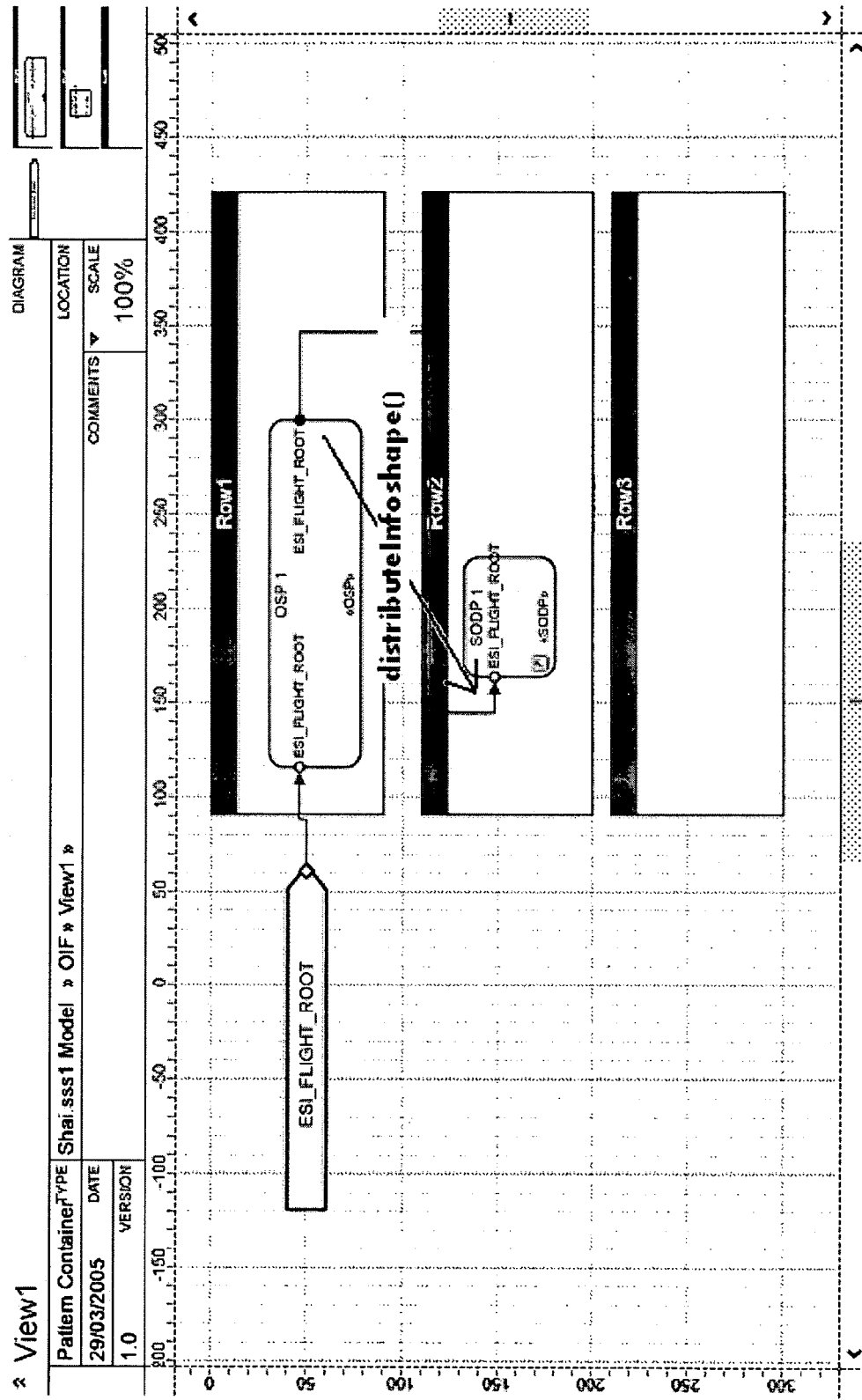
Figure 7:
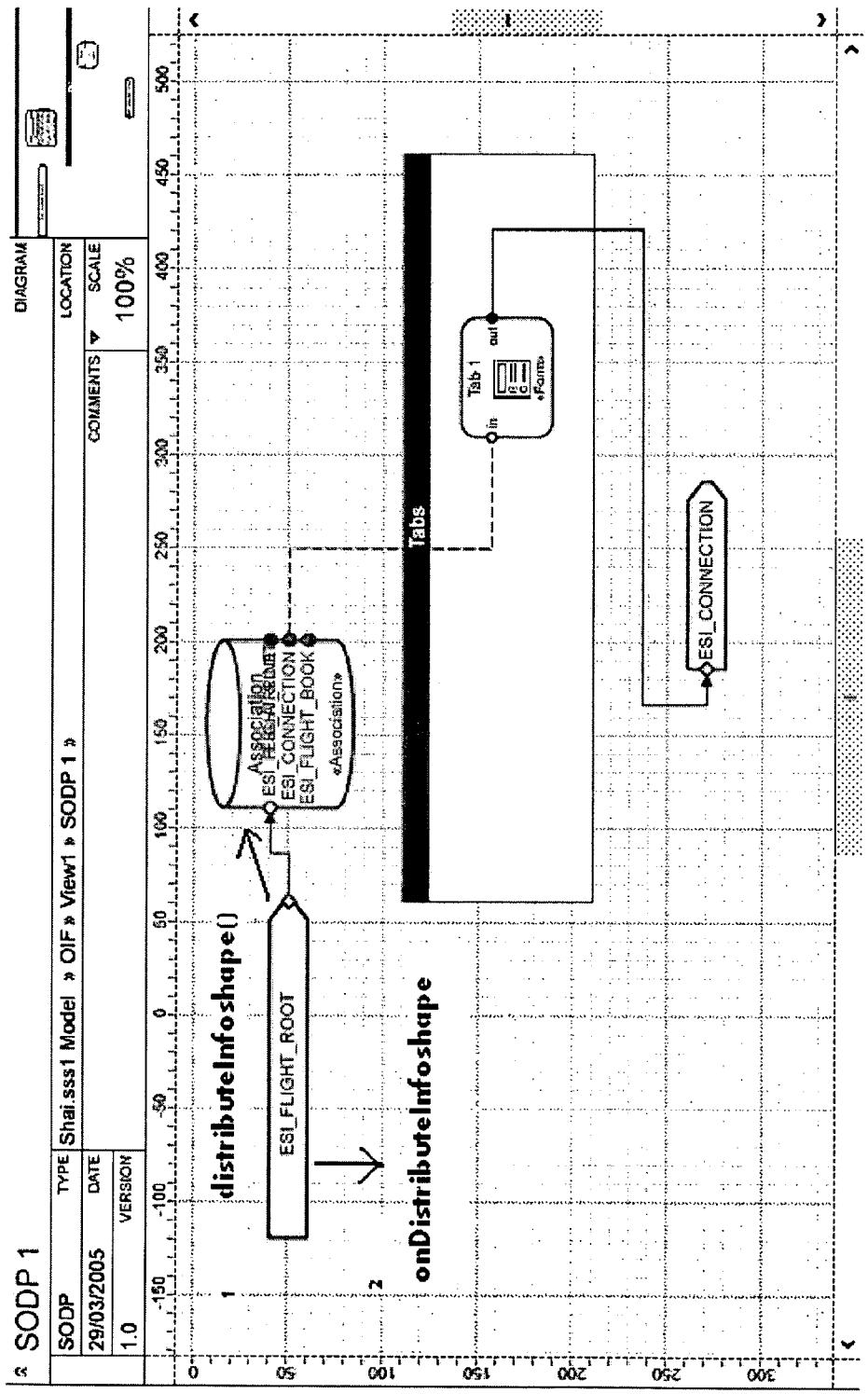

FIG. 5 illustrates the change being distributed through the whole diagram. The method distributeInfoshape is called on the inport of all connected scenarios. FIG. 6 illustrates the change being distributed to other scenarios. Finally, FIG. 7 illustrates the end of the distribution, where the change reaches the inport. The method distributeInfoshape is called for every connected import, as well as the callback method ondistributeInfoshape if it is defined on the parent. But because the distribution has reached a service element, the distribution stops. Once implemented, the service element decides whether or not a new distribution starts.

Figure 8:
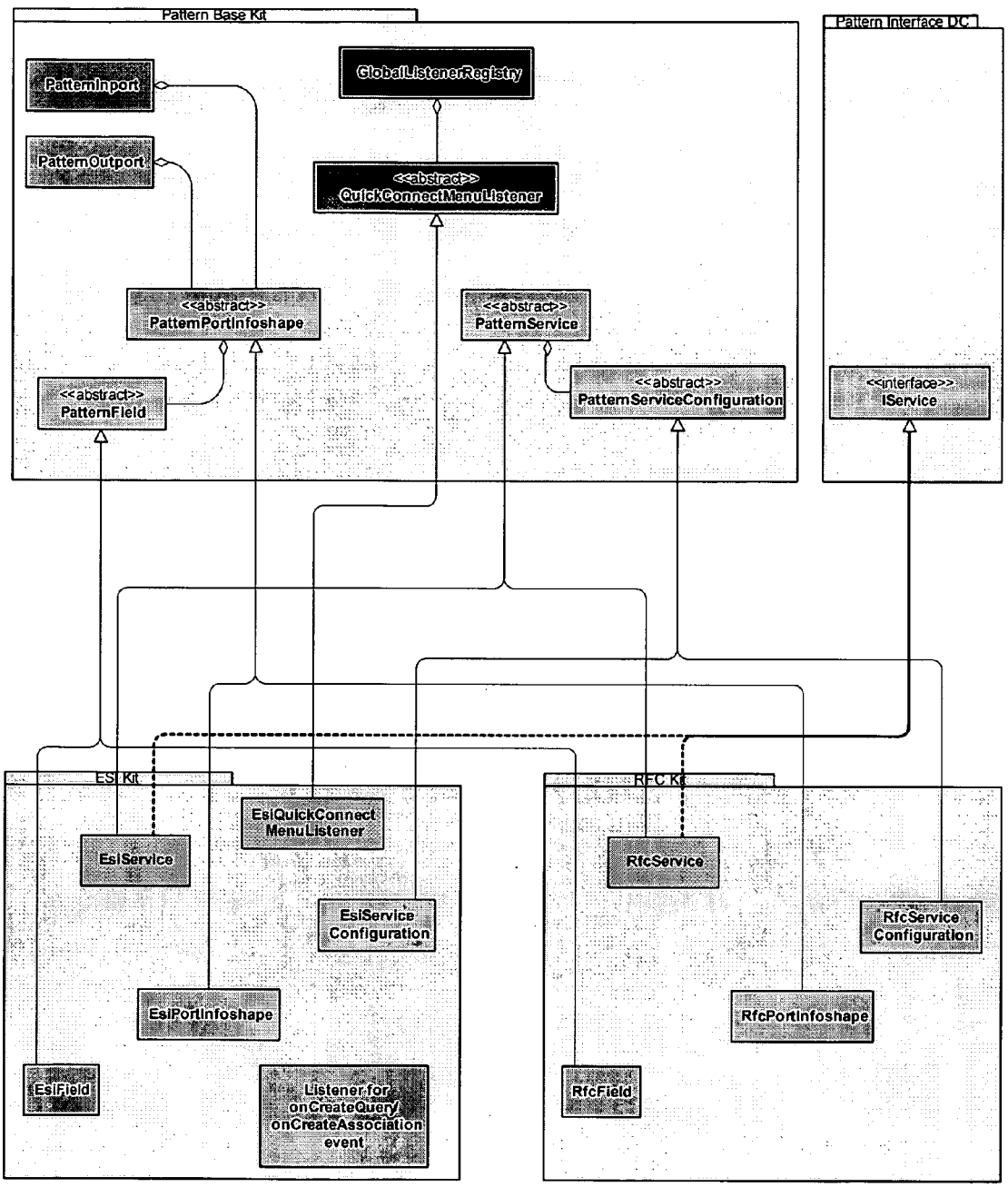
FIG. 8 illustrates an abstraction layer for data providers.

The design time supports different layers of business data. An enterprise services framework (ESF) need not be the only data provider with which a Pattern configuration can work. An alternative data provider can be a remote function call (RCF), for example. As an abstraction layer for data providers, a pattern base kit ("PatternBase") can be used, as depicted in FIG. 8, which also illustrates a separate of an enterprise services infrastructure (ESI) kit.

Only Pattern Base kit defines the classes PatternService, Patter unport and PatternOutport. Concrete service kits (ESI, RFC kits, etc.) do not inherit from any Service and Port class. They must inherit the following abstract classes defined by pattern base kit:

PatternServiceConfiguration: holds the configuration of PatternService.
PatternPortInfoshape: Infoshape of PatternPort.
PatternField: Main configuration element.
PatternSimpleType: stores information about type information. For example additional UI texts like Label text, column text, quick info, etc.
ServiceConfigurator: helper class which is responsible of configuration of a specific service element for a given inport infoshape.
QuickConnectMenuHandler: helper class for handling the on quick connect menu event.

Figure 9:
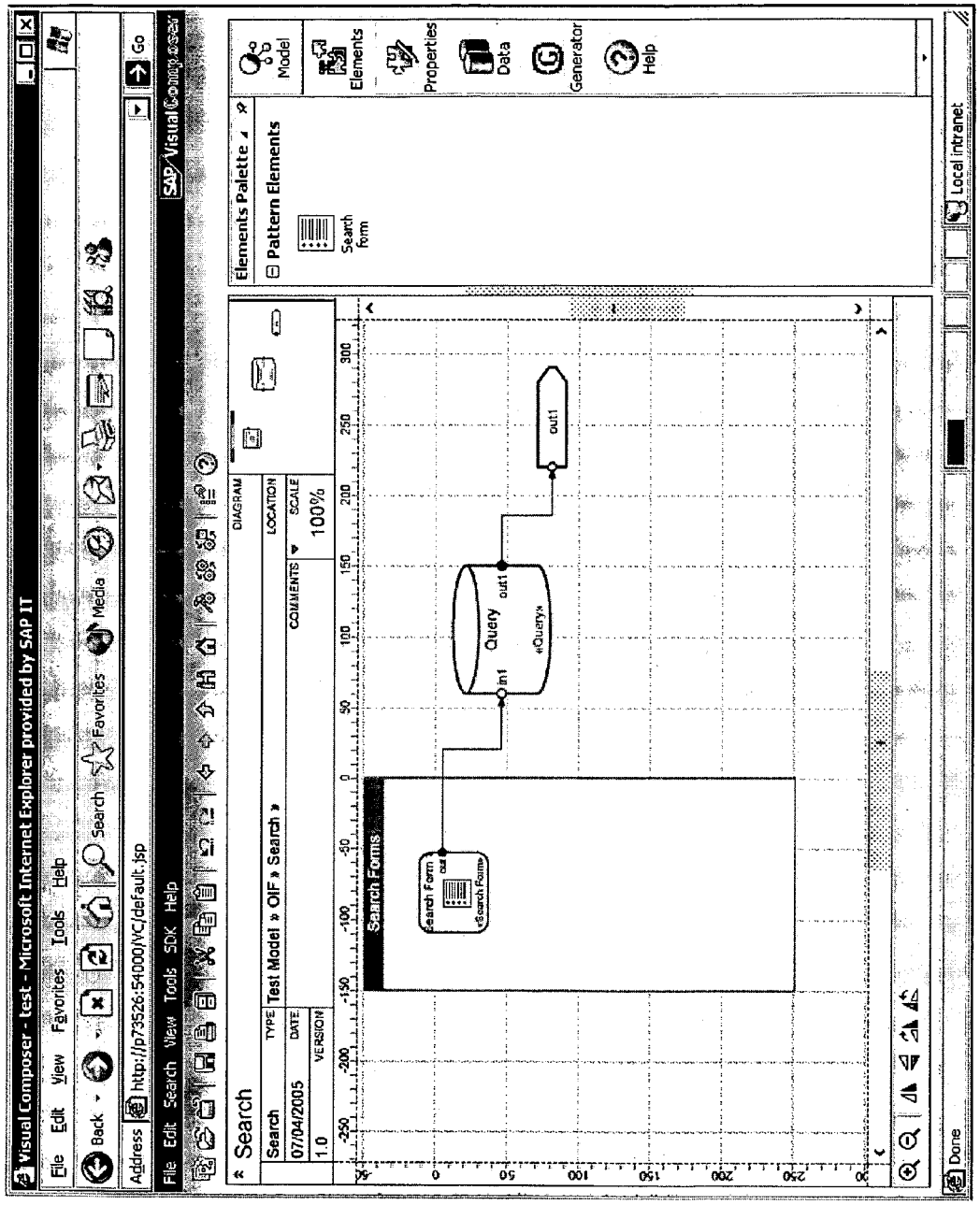
FIG. 9 illustrates the creation of a search scenario.

FIG. 9 illustrates creation step of search scenario where services are undefined. In creation of Search scenario, pattern kit is creating a "PatternService" instance which contains an undefined configuration. This means that "configuration" property of "PatternService" instance is null at that moment.

The distribution mechanism discussed above allows for dynamic creation of a configuration infoshape for a component without using metadata property. An ESI Kit registers to global event "onCreateQuery" from an ESI Discovery Kit. If an "esi query" is dragged over a PatternService, the ESI Kit creates an EsiServiceConfiguration instance and adds it to the PatternService element and configures the PatternService element. The ESI Kit can access and modify PatternService class because it is dependent on PatternBase kit. All Ports in PatternScenario units are of type PatternInport or PatternOutport. If these ports are undefined their infoshape property is null.

If a link is created from PatternServiceOutplug to PatternOutport, the distribution mechanism copies the infoshape properties dynamically. Distribution copy of fields works if the two ports, which are linked together, have the same infoshape type (or the target infoshape is undefined). If the source and target port have a different type of infoshape, the distribution stops and manual interaction from a user is required for how mappings are defined and how the fields of the source port can be mapped to the target port.

Distribution mechanism detects the type of infoshape of the source port and checks if the target port infoshape has the same type (if infoshape of target port is null, the distribution mechanism creates an instance for it). Then, all properties and fields are copied dynamically (in a generic way) to the outport infoshape. The distribution mechanism has no dependency with the ESI kit, and therefore it does not access the infoshape in a particularly structured way. Rather, access is done generically.

Figure 10:
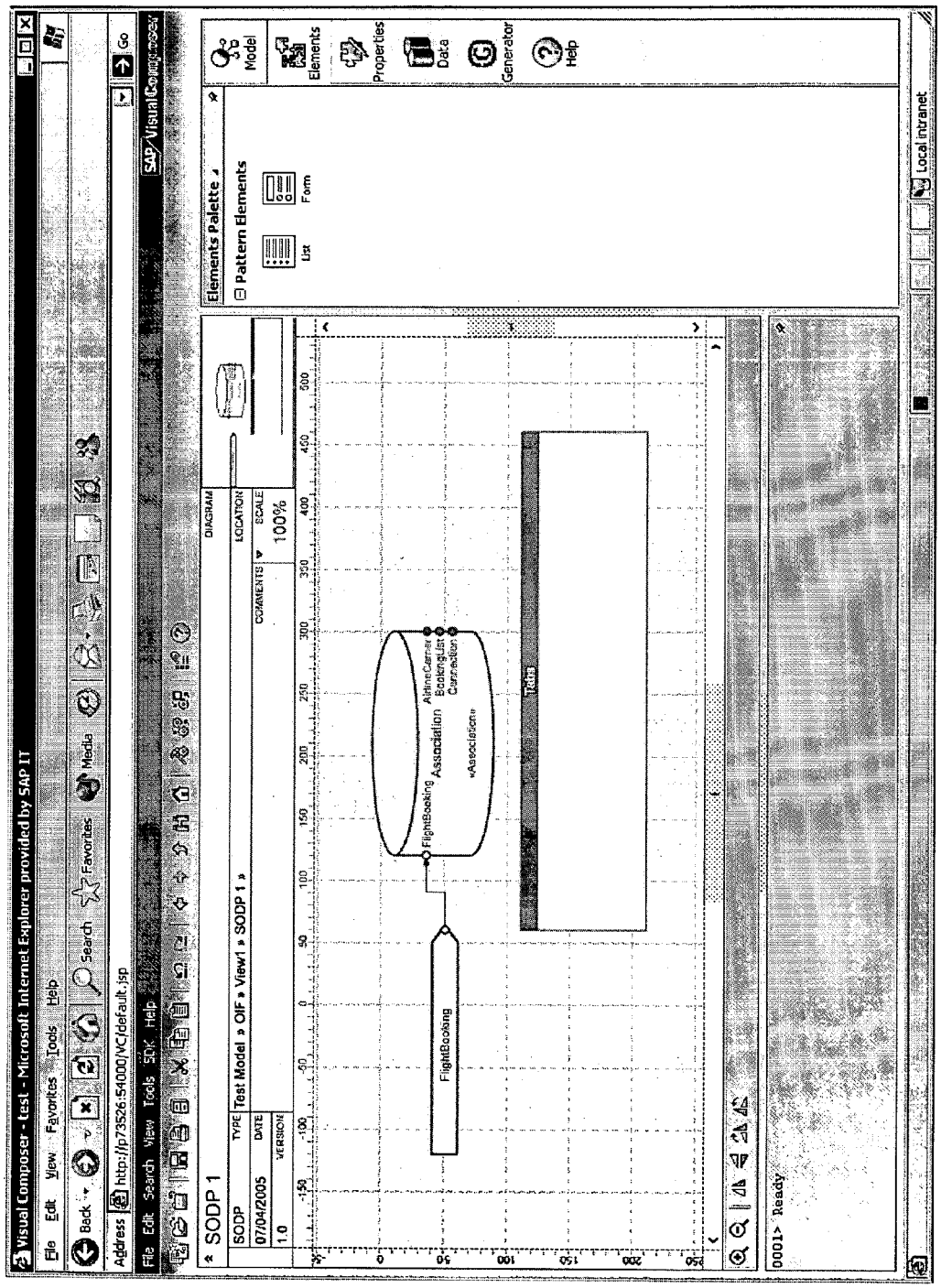
FIG. 10 illustrates the configuration of an SODP scenario.

FIG. 10 illustrates a configuration of an SODP. The SODP scenario creates an inport, a pattern service and a Tab OR-State. It also configures the service since the inport already contains metadata about a configured Business Object node. In the case that query service in search scenario would return RFC related metadata, the inport in the SODP scenario would have an infoshape of type RfcPortInfoshape.

The SODP now configures the pattern service as follows: configuration of pattern service is done via the class ServiceHelperRegistry. This class contains a list of ServiceConfigurator instances (each service kit registers after loading the model of its subclass of ServiceConfigurator) and can ask which of those instances can configure the pattern service for a given infoshape of an inport, and calls the configureService method of the correct instance. The implementation of configureService creates the correct configuration instance for the pattern service and creates all in-an outports including fields.

The following pseudo code tries to explain the SODP scenario. The method configureSODP is called in on-Create method of SODP and can be called for reconfiguration of SODP.

```
method configureSODP( )
    create inport
    create link from port in view scenario to created inport
    call distribution so that inport is configured
    create PatternService element (with no configuration)
    configure patternservice via calling ServiceHelperRegistry with
infoshape of inport as input parameter
        create Tab OR-State
    end
```

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer implemented method of distributing changes in a network-based application, the method comprising:

providing a graphical application modeling tool displaying a model of a pattern of the network-based application, the model comprising a plurality of elements, each element being linked to another element via a port, each port representing a class that contains information about pattern qualities of that port as related to the element;

propagating within the computer-implemented graphical model comprising the linked plurality of elements a change applied to a first element of the plurality of elements of the model, displayed on the graphical application modeling tool, of the pattern of the network-based application to a second element of the plurality of elements of the model of the pattern of the network-based application by the first element distributing the change to the second element via linked ports associated with the first element and the second element to cause the change to be applied to the second element by updating the information at ports of the second element based on the change and updating the second element based on the change; and propagating, within the computer-implemented graphical model comprising the linked plurality of elements, the change applied to the second element of the model, displayed on the graphical application modeling tool, of the pattern of the network-based application to any other element of the plurality of elements of the model of the pattern of the network-based application linked to the second element via ports associated with the second element and the any other element such that each of the any other element is configured to receive the change propagating within the computer-implemented graphical model from a linked element as defined by the model of the pattern of the network-based application, wherein information of respective ports of the each of the any other element receiving the change are updated based on the received change, and the each of the any other element receiving the change is updated based on the received change.

2. The method in accordance with claim 1, wherein the change applied to the first element includes receiving a new attribute to the class related to a port of the first element.

3. The method in accordance with claim 1, further comprising distributing the change from the model to other business scenarios that include the first element.

4. The method in according to claim 1, wherein each port includes an inport and an outport.

5. The method in accordance with claim 4, wherein the inport of the second element is linked with the outport of the first element.

6. The method in accordance with claim 4, wherein the information about the pattern qualities of the each port includes information about a configuration of the inport and outport of the each port.

7. The method in accordance with claim 1, further comprising propagating the change from the second element to a third element within the model of the pattern of the application.

8. The method in accordance with claim 1, further comprising: providing an interface with the graphical application modeling tool, the interface implemented by one or more ports and containing one or more units; and overriding default generic distribution of data changes via the interface.

9. The method in accordance with claim 1, further comprising: defining abstractions for distribution-related classes in a pattern-based kit; and distributing the abstractions via a universal data provider.

10. The method in accordance with claim 1, further comprising adding new application modeling kits to the graphical application modeling tool, each application modeling kits providing at least one self-contained pattern.

11. A computer program product residing on a computer readable storage device and comprising computer instructions that, when executed on a data processing apparatus, cause the data processing apparatus to:

provide a graphical application modeling tool displaying a model of a pattern of a network-based application, the model comprising a plurality of elements, each element being linked to another element via a port, each port representing a class that contains information about pattern qualities of that port as related to the element;

propagate within the computer-implemented graphical model comprising the linked plurality of elements a change applied to a first element of the plurality of elements of the model, displayed on the graphical application modeling tool, of the pattern of the network-based application to a second element of the plurality of elements of the model of the pattern of the network-based application by the first element distributing the change to the second element via linked ports associated with the first element and the second element to cause the change to be applied to the second element by updating the information at ports of the second element based on the change and updating the second element based on the change; and propagate, within the computer-implemented graphical model comprising the linked plurality of elements, the change applied to the second element of the model, displayed on the graphical application modeling tool, of the pattern of the network-based application to any other element of the plurality of elements of the model of the pattern of the network-based application linked to the second element via ports associated with the second element and the any other element such that each of the any other element is configured to receive the change propagating within the computer-implemented graphical model from a linked element as defined by the model of the pattern of the network-based application, wherein information of respective ports of the each of the any other element receiving the change are updated based on the received change, and the each of the any other element receiving the change is updated based on the received change.

12. The computer program product in accordance with claim 11, wherein the change applied to the first element includes receiving a new attribute to the class related to a port of the first element.

13. A computer program product in accordance with claim 11, being further operable to cause a data processing apparatus to distribute the change from the model to other business scenarios that include the first element.

14. A computer program product in accordance with claim 11, wherein each port includes an inport and an outport.

15. A computer program product in accordance with claim 14, wherein the inport of the second element is linked with the outport of the first element.

16. A computer program product in accordance with claim 14, wherein the information about the pattern qualities of the each port includes information about a configuration of the inport and outport of the each port.

17. A computer program product in accordance with claim 11, being further operable to cause a data processing apparatus to propagate the change from the second element to a third element within the model of the pattern of the application.

18. A system for distributing changes in a network-based application, the system comprising:
at least one processor; and
a storage device coupled to the at least one processor, the storage device storing computer instructions that when executed on the at least one processor cause the at least one processor to:
provide a graphical application modeling tool having a plurality of data handling components and a plurality of user interaction components, the graphical application modeling tool displaying a model of a pattern of the network-based application, the model comprising a plurality of elements, each element being linked to another element via a port, each port representing a class that contains information about pattern qualities of that port as related to the element;
provide a distribution layer connected between the plurality of data handling components and the plurality of user interaction components, the distribution layer configured to propagate within the computer-implemented graphical model comprising the linked plurality of elements a change applied to a first element of the plurality of elements of the model, displayed on the graphical application modeling tool, of the pattern of the network-based application to a second element of the plurality of elements of the model of the pattern of the network-based application by the first element distributing the change to the second element via linked ports associated with the first element and the second element to cause the change to be applied to the second element by updating the information at ports of the second element based on the change and updating the second element based on the change; and
propagate, within the computer-implemented graphical model comprising the linked plurality of elements, the change applied to the second element of the model, displayed on the graphical application modeling tool, of the pattern of the network-based application to any other element of the plurality of elements of the model of the pattern of the network-based application linked to the second element via ports associated with the second element and the any other element such that each of the any other element is configured to receive the change propagating within the computer-implemented graphical model from a linked element as defined by the model of the pattern of the network-based application, wherein information of respective ports of the each of the any other element receiving the change are updated based on the received change, and the each of the any other element receiving the change is updated based on the received change.

19. A system in accordance with claim 18, wherein the distribution layer includes a plurality of generic abstract classes to interface with the class associated with at least one of the linked ports.

* * * * *